United States Patent
Alfes et al.

(10) Patent No.: US 8,985,587 B2
(45) Date of Patent: Mar. 24, 2015

(54) SHAFT SEAL FOR A TURBOMACHINE

(75) Inventors: Ludger Alfes, Dorsten (DE); Wolfgang Zacharias, Duisburg (DE)

(73) Assignee: Siemens Aktiengesellschaft, München (DE)

( * ) Notice: Subject to any disclaimer, the term of this patent is extended or adjusted under 35 U.S.C. 154(b) by 617 days.

(21) Appl. No.: 13/203,542

(22) PCT Filed: Mar. 4, 2010

(86) PCT No.: PCT/EP2010/052731
§ 371 (c)(1),
(2), (4) Date: Nov. 10, 2011

(87) PCT Pub. No.: WO2010/102940
PCT Pub. Date: Sep. 16, 2010

(65) Prior Publication Data
US 2012/0043727 A1    Feb. 23, 2012

(30) Foreign Application Priority Data

Mar. 10, 2009 (DE) .......................... 10 2009 012 038

(51) Int. Cl.
*F16J 15/34* (2006.01)
*F01D 11/04* (2006.01)
*F16J 15/40* (2006.01)

(52) U.S. Cl.
CPC .............. *F16J 15/40* (2013.01); *F16J 15/3484* (2013.01)
USPC ........................... 277/370; 277/371; 277/431

(58) Field of Classification Search
USPC ......... 277/361, 367, 369, 370, 371, 348, 350, 277/408, 431, 432
See application file for complete search history.

(56) References Cited

U.S. PATENT DOCUMENTS

| | | | | |
|---|---|---|---|---|
| 3,099,453 A | * | 7/1963 | Dunn et al. | 277/388 |
| 3,508,758 A | * | 4/1970 | Strub | 277/432 |
| 4,123,069 A | * | 10/1978 | Sato | 277/391 |
| 4,905,810 A | | 3/1990 | Bahrenburg | |
| 5,412,977 A | | 5/1995 | Lorenzen | |
| 5,468,002 A | * | 11/1995 | Wasser | 277/361 |
| 5,639,096 A | * | 6/1997 | Ullah | 277/401 |
| 5,873,574 A | * | 2/1999 | Ringer | 277/389 |
| 6,726,215 B2 | * | 4/2004 | Uesugi et al. | 277/431 |
| 2003/0030225 A1 | | 2/2003 | Mizobuchi et al. | |

FOREIGN PATENT DOCUMENTS

| | | |
|---|---|---|
| DE | 4225642 C1 | 7/1993 |
| DE | 69305351 T3 | 11/2002 |

(Continued)

*Primary Examiner* — Kristina Fulton
*Assistant Examiner* — L. Susmitha Koneru

(57) ABSTRACT

A shaft seal for a turbomachine is provided for sealing process side of the turbomachine against the atmosphere. The shaft seal includes a process gas seal which is acted upon by a process gas and be blocked on the process side, an atmosphere seal which is acted upon by air and be blocked on the atmosphere side, and a ventilation chamber extending around the shaft of the turbomachine. The ventilation chamber is arranged between the process gas seal and the atmosphere seal for collecting and discharging a process gas leakage that has passed through the process gas seal and an air leakage that has passed through the atmosphere seal. The ventilation chamber includes a radially inner leakage inlet, a radially outward leakage outlet and built in components that are dimensioned to as to provide a flame blocking function with regard to ignition of the leakage at the leakage inlet.

15 Claims, 1 Drawing Sheet

(56) References Cited

FOREIGN PATENT DOCUMENTS

| | | |
|---|---|---|
| DE | 102007012728 A1 | 9/2008 |
| EP | 0819873 A1 | 1/1998 |
| EP | 1914387 A1 | 4/2008 |
| JP | 2004084688 A | 3/2004 |
| RU | 93055858 | 8/1995 |
| RU | 23937 U1 | 7/2002 |

* cited by examiner

SHAFT SEAL FOR A TURBOMACHINE

CROSS REFERENCE TO RELATED APPLICATIONS

This application is the US National Stage of International Application No. PCT/EP2010/052731, filed Mar. 4, 2010 and claims the benefit thereof. The International Application claims the benefits of German application No. 10 2009 012 038.6 DE filed Mar. 10, 2009. All of the applications are incorporated by reference herein in their entirety.

FIELD OF INVENTION

The invention refers to a shaft seal for a turbomachine.

BACKGROUND OF INVENTION

A turbocompressor, an expander or a positive displacement compressor, for example, is understood by a turbomachine. The turbocompressor has a casing and a rotor which is accommodated in the casing. The rotor has a shaft which is supported by its longitudinal ends outside the casing. As a result, the shaft passes through the casing by its longitudinal ends, wherein the shaft is sealed there against the casing by a shaft seal. Therefore, the interior of the turbocompressor is isolated from the atmosphere. The construction of the shaft seal is conventionally such that an arrangement is made first of all for a gas separator and then for an oil separator, as seen from the interior of the turbocompressor. The interior of the turbocompressor, that is to say the process side, is isolated by means of the shaft seal from the atmosphere and by means of the oil separator from the bearing region. The shaft seal is constructed as a gas-lubricated mechanical seal, for example, which is designed as a tandem seal. The tandem seal is constructed from two gas-lubricated mechanical seals which in each case have a sliding ring, which is fastened on the casing, and a counter ring, which is fastened on the shaft. Each sliding ring is arranged axially directly adjacent to its associated counter ring, forming an axial gap. The rings are arranged in the tandem seal in such a way that by the primary seal the process side is sealed against a flare pressure. By the secondary seal, the isolation against the atmosphere is brought about, wherein the secondary seal is provided additionally as redundancy to the primary seal in the event of failure of said primary seal. Barrier gas, which is used for blocking the axial gaps, is introduced between the two counter rings. In order to isolate the bearing region, a tertiary seal, for example, which can be constructed as a labyrinth seal or a carbon ring seal, is provided as the oil separator. The tertiary seal is acted upon by a barrier gas, as a result of which its blocking is brought about.

SUMMARY OF INVENTION

Air can be used as the barrier gas. During operation of the turbocompressor, the air consisting of the barrier gas mixes with the process gas, as a result of which a flammable mixture may develop if the process gas is combustible. The forming of the ignitable gas mixture is always to be prevented for safety reasons, which is prescribed in an explosion protection directive, for example. The use of an inert gas, for example nitrogen, as the barrier gas provides a remedy. During operation of the turbocompressor in a petrochemical plant, the consumption of nitrogen as the barrier gas is high, however, so that the cost of providing nitrogen and the costs associated therewith are considerable.

It is the object of the invention to create a shaft seal for a turbomachine, wherein the turbomachine can be operated with low costs in a resource-conserving manner.

The shaft seal according to the invention for a turbomachine, the process side of which can be sealed against the atmosphere by means of the shaft seal, has a process gas seal which can be acted upon by a process gas and be blocked on the process side, and an atmosphere seal which can be acted upon by air and be blocked on the atmosphere side, and also a ventilation chamber which extends around a shaft of the turbomachine and is arranged between the process gas seal and the atmosphere seal for collecting and discharging process gas leakage, which has passed through the process gas seal, and air leakage, which has passed through the atmosphere seal, wherein the ventilation chamber has a leakage inlet on its radially inner side and a leakage outlet on its radially outer side, and also built-in components between the leakage inlet and the leakage outlet, wherein the built-in components are dimensioned in such a way that the ventilation chamber has a flame-blocking function with regard to an ignition of the leakage at the leakage inlet and/or the leakage in the ventilation chamber is not ignitable.

During the hazard assessment of the explosive gas mixture which is entrapped in the ventilation chamber according to an explosion protection directive, the entrapped volume and the surface available for cooling are of vital importance. As a result of providing the built-in components in the ventilation chamber, this is dimensioned according to the invention in such a way that in the ventilation chamber the gas mixture has a volume which is small, as a result of which the gas mixture which is present in the ventilation chamber is to be classed as non-ignitable according to the explosion protection directive. Furthermore, an enlarged surface is provided in the ventilation chamber by the built-in components, via which the gas mixture in the ventilation chamber is additionally cooled. If, however, an ignition in the ventilation chamber should take place, then the heat from the enlarged surface which develops in the process is dissipated immediately so that the ignition extinguishes again immediately.

It is preferred that the built-in components feature radially extending ribs by which ventilation passages are formed in the ventilation chamber and through which the leakage can flow from the leakage inlet to the leakage outlet. The ventilation chamber is preferably formed as a cylindrical space around the shaft, in which the ribs extend radially around said shaft. The circumferential extent of at least some of the ribs preferably increases with the radius, wherein the ribs are preferably dimensioned in such a way that the cross section of the ventilation passages is constant over the radius. Alternatively, it is preferred that the circumferential extent of at least some of the ribs is constant over the radius. The cross section which is effectively exposed to throughflow at the leakage inlet is preferably approximately equal in size to the cross section which is effectively exposed to throughflow at the leakage outlet. Furthermore, it is preferred that the cross section which is effectively exposed to throughflow at the leakage outlet is equal in size to or larger than the cross section which is effectively exposed to throughflow of a leakage discharge line which is connected to the leakage outlet.

The ribs are preferably formed with a rounding on their radially inner sides so that the throughflow of the leakage through the ventilation chamber is with low loss. As a result, an additional flow resistance is brought about by means of the ribs and an undesirable pressure increase associated therewith is prevented. The number and the shape of the ribs are preferably selected so that the ribs are suitable for cooling the leakage in the ventilation chamber.

The process gas seal is preferably a gas-lubricated mechanical seal and/or the atmosphere seal is a labyrinth seal or a carbon ring seal. The gas-lubricated mechanical seal is preferably constructed in a tandem arrangement, wherein the gas-lubricated mechanical seal has a primary seal, which can be acted upon by the process gas and be blocked on the process side, and a secondary seal which is arranged downstream of the primary seal in the direction of the atmosphere and safeguards this primary seal, wherein the ventilation chamber is located between the secondary seal and the atmosphere seal. Furthermore, it is preferred that the built-in components feature a wire mesh.

BRIEF DESCRIPTION OF THE DRAWINGS

In the following text, a preferred embodiment of the shaft seal according to the invention is explained with reference to the attached schematic drawings. In the drawing.

DETAILED DESCRIPTION OF INVENTION

Figure 1:
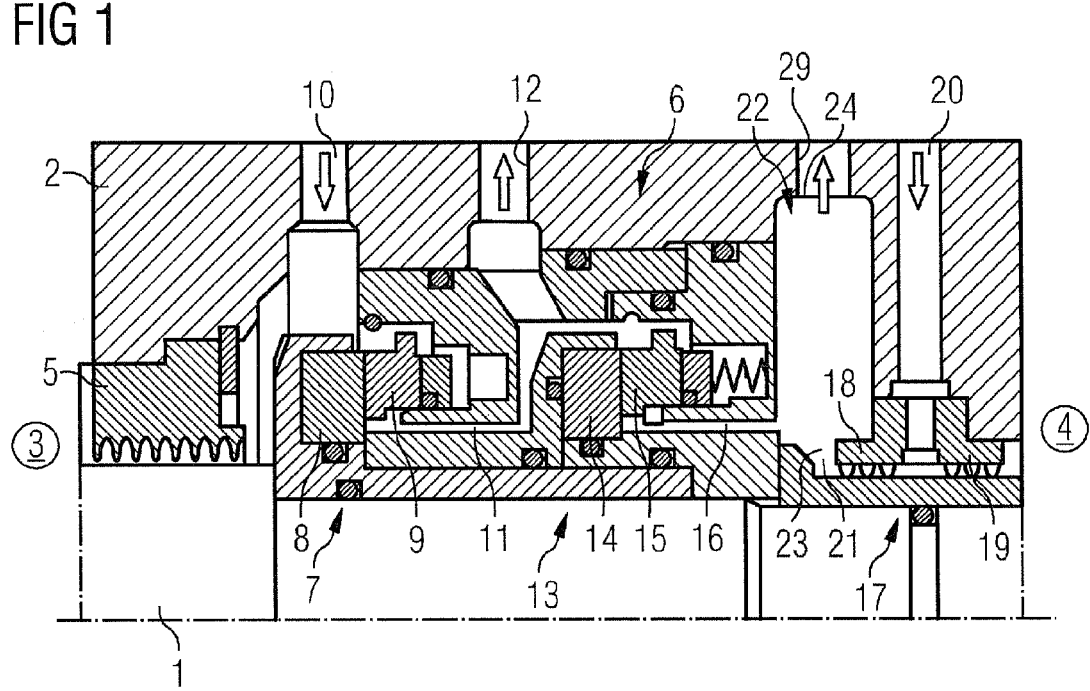
FIG. 1 shows a longitudinal section through the embodiment of the shaft seal and FIG. 2 shows a cross section through the ventilation chamber of the embodiment of the shaft seal from FIG. 1.
Figure 2:
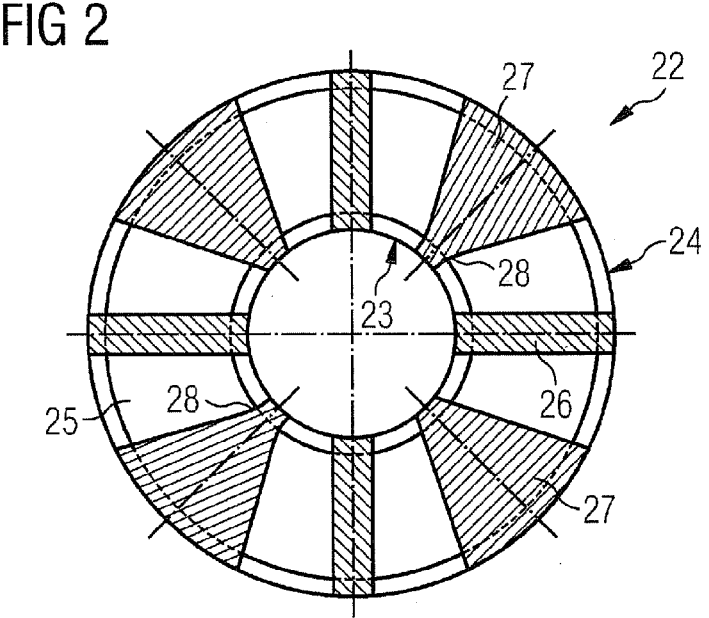

As is apparent from FIGS. 1 and 2, a turbocompressor has a shaft 1 and a casing 2, wherein the shaft 1 penetrates the casing 2 at its longitudinal end which is shown.

The interior of the turbocompressor is formed by a process side 3, whereas the atmosphere 4 prevails outside the turbocompressor. On the process side, a higher pressure prevails in the turbocompressor during operation than atmospheric pressure so that the shaft 1 is sealed against the casing 2 by the process side 3 towards the atmosphere 4. The sealing is brought about by a labyrinth seal 5, which is provided on the process side, and a gas-lubricated mechanical seal 6, which is installed between the labyrinth seal 5 and the atmosphere 4. The gas-lubricated mechanical seal 6 has a primary seal 7 which is arranged directly downstream of the labyrinth seal 5 and is designed for sealing the pressure which prevails there. The primary seal 7 has a counter ring 8 which is mounted on the shaft 1 of the turbocompressor and a sliding ring 9 which is installed in the casing 2 of the turbocompressor. The counter ring 8 and the sliding ring 9 are arranged in a manner in which they lie axially next to each other, wherein the counter ring 8 is arranged between the labyrinth seal 5 and the sliding ring 9. During operation of the turbocompressor, the counter ring 8 rotates with the shaft 1 so that a relative movement prevails between the counter ring 8 and the sliding ring 9. As a result, during operation of the turbocompressor an axial gap is to be created between the counter ring 8 and the sliding ring 9 so that the counter ring 8 is not in touching contact with the sliding ring 9. The axial gap is created as a result of the primary seal 7 being acted upon by product gas which is fed to the primary seal 7 radially through a product gas purging line 10 which is provided in the turbocompressor casing 2.

The consequence of the axial gap, however, is that product gas passes through it as leakage and collects in a leakage chamber 11 downstream of the primary seal 7. The leakage gas which is collected in the leakage chamber 11 is discharged to a flare, for example, by means of a flare line 12 which is correspondingly provided in the turbocompressor casing 2. A secondary seal 13, which is arranged on the side of the primary seal 7 facing away from the labyrinth seal 5, seals the pressure which prevails in the leakage chamber 11 or in the flare line 12. The secondary seal 13 is constructed like the primary seal 7, wherein the secondary seal 13 has a counter ring 14, which is connected to the shaft 1 of the turbocompressor, and a stationary sliding ring 15, which is connected to the casing 2 of the turbocompressor. The counter ring 14 and the sliding ring 15, like the counter ring 8 and the sliding ring 9 of the primary seal 7, lie next to each other, forming an axial gap. Formed downstream of the secondary seal 13 is a leakage chamber 16 in which is collected the leakage which flows through the secondary seal 13.

For isolating the atmosphere 4 from the leakage chamber 16, a tertiary seal 17, which consists of a process-side labyrinth seal 18 and an atmosphere-side labyrinth seal 19, is provided between the secondary seal 13 and the atmosphere 4. Between the labyrinth seals 18, 19, provision is made for an air purging line 20 through which air flows for purging the labyrinth seals 18, 19. The air flow which is delivered through the air purging line 20 is distributed on the shaft 1 of the turbomachine so that the air passes through both the process-side labyrinth seal 18 and the atmosphere-side labyrinth seal 19. The air portion which passes through the process-side labyrinth seal 18 flows into a leakage chamber 21 which, like the leakage chamber 16 of the secondary seal 13, leads into a ventilation chamber 22. The ventilation chamber 22 is arranged as an annulus between the secondary seal 13 and the tertiary seal 17, wherein provision is made on the radially inner section of the ventilation chamber 22 for a leakage inlet 22 through which air from the leakage chamber 21 of the tertiary seal 17 and process gas from the leakage chamber 16 of the secondary seal 13 flow into the ventilation chamber 22. Radially on the outside, provision is made in the ventilation chamber 22 for a leakage outlet to which is connected a ventilation line 29.

The ventilation chamber 22, in its interior space, has a multiplicity of ribs 26, 27 which extend radially from the leakage inlet 23 to the leakage outlet 24. The ribs 26, 27 extend also in the axial direction so that by the ribs a multiplicity of ventilation passages 25 are formed in the ventilation chamber 22 between said ribs 26, 27.

As is shown in FIG. 2, provision is made in the ventilation chamber 22 for eight ribs 26, 27 which are arranged in a uniform distribution over the circumference. Altogether four ribs 26 of equal thickness are formed, extending horizontally and vertically, and altogether four widening ribs 27 are formed, extending diagonally. The radial thickness progressions of the ribs 26, 27 are selected in such a way that the total volume of the ventilation passages 25 in the ventilation chamber 22 is small in such a way that according to an explosion protection directive the gas mixture which is present in the ventilation passages 25, specifically a gaseous mixture consisting of air and process gas, is not classed as being ignitable. In this case, consideration is given to the fact that the cross section of the leakage outlet 24 is adapted to the cross section of the ventilation line 29 and the cross section of the leakage inlet 23 is equal in size to the cross section of the leakage outlet 24. As a result, the effect of irregular and therefore excessively loss-affected flow conditions prevailing in the ventilation chamber 22 is prevented. Furthermore, provision is made on the ribs 26, 27 at the leakage inlet 23 for entry radii 28 so that the flow resistance of the ribs 26, 27 is as low as possible.

The invention claimed is:

1. A shaft seal for a turbomachine, the shaft seal being adapted to seal a process side of the turbomachine against the atmosphere, the shaft seal comprising:
a process gas seal which can be acted upon by a process gas and be blocked on the process side;

an atmosphere seal which can be acted upon by air and be blocked on the atmosphere side; and a ventilation chamber extending around the shaft of the turbomachine, the ventilation chamber being arranged between the process gas seal and the atmosphere seal for collecting and discharging a process gas leakage that has passed through the process gas seal and an air leakage that has passed through the atmosphere seal, the ventilation chamber comprising:

a leakage inlet on a radially inner side of the ventilation chamber, a leakage outlet on a radially outer side of the ventilation chamber, and built-in components between the leakage inlet and the leakage outlet, wherein the built-in components are dimensioned in such a way that:

the ventilation chamber has a flame blocking function with regard to ignition of the leakage at the leakage inlet, and/or the leakage in the ventilation chamber is not ignitable.

2. The shaft seal as claimed in claim 1, wherein the built-in components feature radially extending ribs by which ventilation passages are formed in the ventilation chamber and which provides a surface to guide a flow of the leakage all the way from the leakage inlet to the leakage outlet.

3. The shaft seal as claimed in claim 2, wherein the ventilation chamber is formed as a cylindrical annulus around the shaft in which the ribs extend radially around the shaft.

4. The shaft seal as claimed in claim 3, wherein the circumferential extent of at least some of the ribs increases with the radius.

5. The shaft seal as claimed in claim 4, wherein the ribs are dimensioned in such a way that the cross section of the ventilation passages is constant over the radius.

6. The shaft seal as claimed in claim 3, wherein the circumferential extent of at least some of the ribs is constant over the radius.

7. The shaft seal as claimed in claim 3, wherein a cross section which is effectively exposed to throughflow at the leakage inlet is approximately equal in size to a cross section which is effectively exposed to throughflow at the leakage outlet.

8. The shaft seal as claimed in claim 7, wherein the cross section which is effectively exposed to throughflow at the leakage outlet is equal to or larger than the cross section which is effectively exposed to throughflow of a leakage discharge line which is connected to the leakage outlet.

9. The shaft seal as claimed in claim 2, wherein the ribs are formed with a rounding on their radially inner sides so that the flow of leakage through the ventilation chamber is with low loss.

10. The shaft seal as claimed in claim 2, wherein the number and the shape of the ribs are selected so that the ribs are suitable for cooling the leakage in the ventilation chamber.

11. The shaft seal as claimed in claim 1, wherein the gas seal is a gas-lubricated mechanical seal and/or the atmosphere seal is a labyrinth seal or a carbon ring seal.

12. The shaft seal as claimed in claim 11, wherein the gas-lubricated mechanical seal is constructed in a tandem arrangement, wherein the gas-lubricated mechanical seal has a primary seal which can be acted upon by the process gas and be blocked on the process side, and a secondary seal which is arranged downstream of the primary seal in the direction of the atmosphere and safeguards this primary seal, wherein the ventilation chamber is located between the secondary seal and the atmosphere seal.

13. The shaft seal as claimed in claim 1, wherein the built-in components feature a wire mesh.

14. A shaft seal for a turbomachine, the shaft seal being adapted to seal a process side of the turbomachine against the atmosphere, the shaft seal comprising:

a process gas seal which can be acted upon by a process gas and be blocked on the process side;

an atmosphere seal which can be acted upon by air and be blocked on the atmosphere side; and a ventilation chamber extending around the shaft of the turbomachine, the ventilation chamber being arranged between the process gas seal and the atmosphere seal for collecting and discharging a process gas leakage that has passed through the process gas seal and an air leakage that has passed through the atmosphere seal, the ventilation chamber comprising:

a leakage inlet on a radially inner side of the ventilation chamber, a leakage outlet on a radially outer side of the ventilation chamber, and means for blocking a flame in the ventilation chamber with regard to ignition of the leakage at the leakage inlet, and/or means for preventing ignition of the leakage in the ventilation chamber.

15. The shaft seal according to claim 14, wherein said means for blocking a flame in the ventilation chamber with regard to ignition of the leakage at the leakage inlet and/or means for preventing ignition of the leakage in the ventilation chamber is/are arranged within the ventilation chamber between the leakage inlet and the leakage outlet.

* * * * *